US010280689B2

(12) United States Patent
Shabalala et al.

(10) Patent No.: US 10,280,689 B2
(45) Date of Patent: May 7, 2019

(54) POLYCRYSTALLINE SUPERHARD CONSTRUCTION

(71) Applicant: Element Six Abrasives S.A., Luxembourg (LU)

(72) Inventors: Thembinkosi Shabalala, Springs (ZA); Nedret Can, Springs (ZA)

(73) Assignee: Element Six Abrasives S.A., Luxembourg (LU)

( * ) Notice: Subject to any disclaimer, the term of this patent is extended or adjusted under 35 U.S.C. 154(b) by 0 days.

(21) Appl. No.: 15/437,629

(22) Filed: Feb. 21, 2017

(65) Prior Publication Data
US 2017/0183916 A1 Jun. 29, 2017

Related U.S. Application Data

(63) Continuation of application No. 13/534,927, filed on Jun. 27, 2012, now abandoned.

(Continued)

(30) Foreign Application Priority Data

Jun. 30, 2011 (GB) .................................... 1111179.6

(51) Int. Cl.
*E21B 10/573* (2006.01)
*E21B 10/567* (2006.01)
(Continued)

(52) U.S. Cl.
CPC ........ *E21B 10/5735* (2013.01); *E21B 10/567* (2013.01); *B01J 3/062* (2013.01);
(Continued)

(58) Field of Classification Search
CPC ............... E21B 10/567; E21B 10/5673; E21B 10/5676; E21B 10/573; E21B 10/5735
See application file for complete search history.

(56) References Cited

U.S. PATENT DOCUMENTS

| 5,766,394 A | 6/1998 | Anderson et al. |
| 6,041,875 A | 3/2000 | Rai et al. |

(Continued)

FOREIGN PATENT DOCUMENTS

| GB | 2335682 | 9/1999 |
| GB | 2419364 | 4/2006 |
| WO | 2009128034 | 10/2009 |

*Primary Examiner* — David J Bagnell
*Assistant Examiner* — Kristyn A Hall
(74) *Attorney, Agent, or Firm* — Bryan Cave Leighton Paisner LLP

(57) ABSTRACT

A polycrystalline superhard construction comprises a body of polycrystalline superhard material, and a substrate of hard material bonded thereto along an interface. The body of polycrystalline superhard material comprises a first region abutting the substrate along the interface and a second region bonded to the first region. The second region defines a rake face, a cutting edge, a chamfer and at least a part of a flank face, the cutting edge being defined by an edge of the flank face joined to the chamfer, the chamfer extending between the cutting edge and the rake face. The height of the chamfer in a plane parallel to the plane through which the longitudinal axis of the polycrystalline superhard construction extends is less than the thickness of the second region. The first region comprises a material having coarser grains than the second region. There is also disclosed a method of making the same.

17 Claims, 5 Drawing Sheets

Related U.S. Application Data

(60) Provisional application No. 61/503,420, filed on Jun. 30, 2011.

(51) Int. Cl.
    *B01J 3/06*     (2006.01)
    *B24D 18/00*     (2006.01)
    *E21B 10/36*     (2006.01)
    *E21B 10/54*     (2006.01)

(52) U.S. Cl.
    CPC .. *B01J 2203/062* (2013.01); *B01J 2203/0655* (2013.01); *B01J 2203/0685* (2013.01); *B24D 18/0009* (2013.01); *E21B 10/36* (2013.01); *E21B 10/54* (2013.01); *E21B 2010/545* (2013.01)

(56) References Cited

U.S. PATENT DOCUMENTS

| | | |
|---|---|---|
| 6,446,740 B2 | 9/2002 | Eyre |
| 2010/0294571 A1 | 11/2010 | Belnap et al. |
| 2011/0088950 A1 | 4/2011 | Scott et al. |

POLYCRYSTALLINE SUPERHARD CONSTRUCTION

FIELD

This disclosure relates to a cutter comprising a superhard construction, particularly but not exclusively for a rotary drill bit for boring into the earth.

BACKGROUND

Polycrystalline diamond (PCD) material comprises a mass of inter-grown diamond grains and interstices between the diamond grains. PCD material may be made by subjecting an aggregated mass of diamond grains to a high pressure and temperature in the presence of a sintering aid such as cobalt, which may promote the inter-growth of diamond grains. The sintering aid may also be referred to as a catalyst material for diamond. PCD material may be formed on a cobalt-cemented tungsten carbide substrate, which may provide a source of cobalt catalyst material for sintering the PCD material.

PCD material may be used in a wide variety of tools for cutting, machining, drilling or degrading hard or abrasive materials such as rock, metal, ceramics, composites and wood-containing materials. For example, tool inserts comprising PCD material are widely used in drill bits used for boring into the earth in the oil and gas drilling industry. In many of these applications, the temperature of the PCD material may become elevated as it engages rock or other workpiece or body with high energy. The working life of tool inserts may be limited by fracture of the superhard material, including by spalling and chipping.

In use as a cutting element in tools such as those mentioned above, the body of PCD material normally wears according to the following progression: smooth wear, woody wear, accelerated wear, spalling. Spalling usually occurs when the wear scar reaches the top working surface, and results in catastrophic wear failure.

As used herein, the term "barrel chipping" refers to chipping in the body of PCD material below a main wear-scar.

Smooth wear as used herein refers to wear occurring at the diamond grain level where individual grains or fractions of grains are removed.

Woody wear as used herein refers to the regime where the wear-scar becomes irregular at the edges and cracking visible. The rough appearance of the wear-scar is possibly due to wear processes at a scale of more than one grain.

As used herein the term spalling refers to catastrophic failure due to wear cracks propagating to top of the PCD body acting as a cutter table.

Durability here refers to distance cut before cutter failure. High-durability cutters tend to maintain cutting integrity but eventually become ineffective due to formation of a very large wear-scar and hence impractical load application requirements. Prevention of spalling would increase lifetime/durability of the cutter and there is therefore a need for a product in which spalling is partially or completely inhibited and a method of producing such a cutter.

SUMMARY

Viewed from a first aspect there is provided a polycrystalline superhard construction comprising:
a body of polycrystalline superhard material;
a substrate of hard material bonded to the body of polycrystalline superhard material along an interface;
wherein the body of polycrystalline superhard material comprises a first region and a second region, the first region abutting the substrate along the interface and the second region being bonded to the first region along a further interface,
the second region defining a rake face, a chamfer, a cutting edge, and at least a part of a flank face, the cutting edge being defined by an edge of the flank face joined to the chamfer, the chamfer extending between the cutting edge and the rake face;
the first region having a first thickness and the second region having a second thickness;
the chamfer having a height in a plane parallel to the plane through which the longitudinal axis of the polycrystalline superhard construction extends, the height of the chamfer being less than the thickness of the second region;
the first region comprising a material having coarser grains than the material of the second region.

Viewed from a second aspect there is provided a cutter for boring into the earth comprising the above-mentioned polycrystalline superhard construction.

Viewed from a third aspect there is provided a PCD element for a rotary shear bit for boring into the earth, for a percussion drill bit or for a pick for mining or asphalt degradation, comprising the above-described polycrystalline superhard construction.

Viewed from a fourth aspect there is provided a drill bit or a component of a drill bit for boring into the earth, comprising the above-described polycrystalline superhard construction.

Viewed from a fifth aspect there is provided a method for making a polycrystalline superhard construction, the method comprising:
providing a first plurality of aggregate masses comprising diamond grains having a first mean size, at least one second aggregate mass comprising diamond grains having a second mean size; arranging the first aggregate mass on the second aggregate mass to form a pre-sinter assembly together with a body of material for forming a substrate; the first region comprising a material having coarser grains than the material of the second region; and
treating the pre-sinter assembly in the presence of a catalyst material for diamond at an ultra-high pressure and high temperature at which diamond is more thermodynamically stable than graphite to sinter together the diamond grains and a substrate bonded thereto along an interface to form an integral PCD construction comprising a first region of PCD bonded to a second region of PCD, the first region being bonded to the substrate; the first region having a first thickness and the second region having a second thickness;
the second region defining a rake face, a cutting edge, and at least a part of a flank face;
the method further comprising:
forming a chamfer in the flank face, the cutting edge being defined by an edge of the flank face joined to the chamfer, the chamfer extending between the cutting edge and the rake face, the chamfer having a height in a plane parallel to the plane through which the longitudinal axis of the superhard construction extends, the height of the chamfer being less than the thickness of the second region.

BRIEF DESCRIPTION OF THE DRAWINGS

Non-limiting embodiments will now be described by way of example and with reference to the accompanying drawings, in which:

FIG. 4b is a side view of an embodiment of a cutter showing the wear scar for the same predetermined number of passes as that applied to the cutter of FIG. 4a;

FIG. 5b is a side view of the embodiment of a cutter shown in FIG. 4b after the same number of passes applied to the conventional cutter of FIG. 5a;

FIG. 7b is a side view of a further embodiment of a cutter showing the wear scar for the same predetermined number of passes as that applied to the cutter of FIG. 7a;

FIG. 8b is a side view of the embodiment of a cutter shown in FIG. 7b after the same number of passes applied to the conventional cutter of FIG. 7a.

DETAILED DESCRIPTION OF EMBODIMENTS

As used herein, a "superhard material" is a material having a Vickers hardness of at least about 25 GPa. Diamond and cubic boron nitride (cBN) material are examples of superhard materials.

As used herein, a "superhard construction" means a construction comprising polycrystalline superhard material or superhard composite material, or comprising polycrystalline superhard material and superhard composite material.

As used herein "polycrystalline superhard" (PCS) material comprises a mass of grains of a superhard material and interstices between the superhard grains, the content of the superhard grains being at least about 50 percent of the material by volume. The grains may comprise diamond or cubic boron nitride (cBN).

As used herein, polycrystalline diamond (PCD) is a PCS material comprising a mass of diamond grains, a substantial portion of which are directly inter-bonded with each other and in which the content of diamond is at least about 80 volume percent of the material with "interstices" or "interstitial regions" between the diamond grains of PCD material.

As used herein, polycrystalline cubic boron nitride (PCBN) material is a PCS material comprising a mass of cBN grains dispersed within a wear resistant matrix, which may comprise ceramic or metal material, or both, and in which the content of cBN is at least about 50 volume percent of the material. In some embodiments of PCBN material, the content of cBN grains is at least about 60 volume percent, at least about 70 volume percent or at least about 80 volume percent. Embodiments of superhard material may comprise grains of superhard materials dispersed within a hard matrix, wherein the hard matrix preferably comprises ceramic material as a major component, the ceramic material preferably being selected from silicon carbide, titanium nitride and titanium carbo-nitride.

Figure 1:
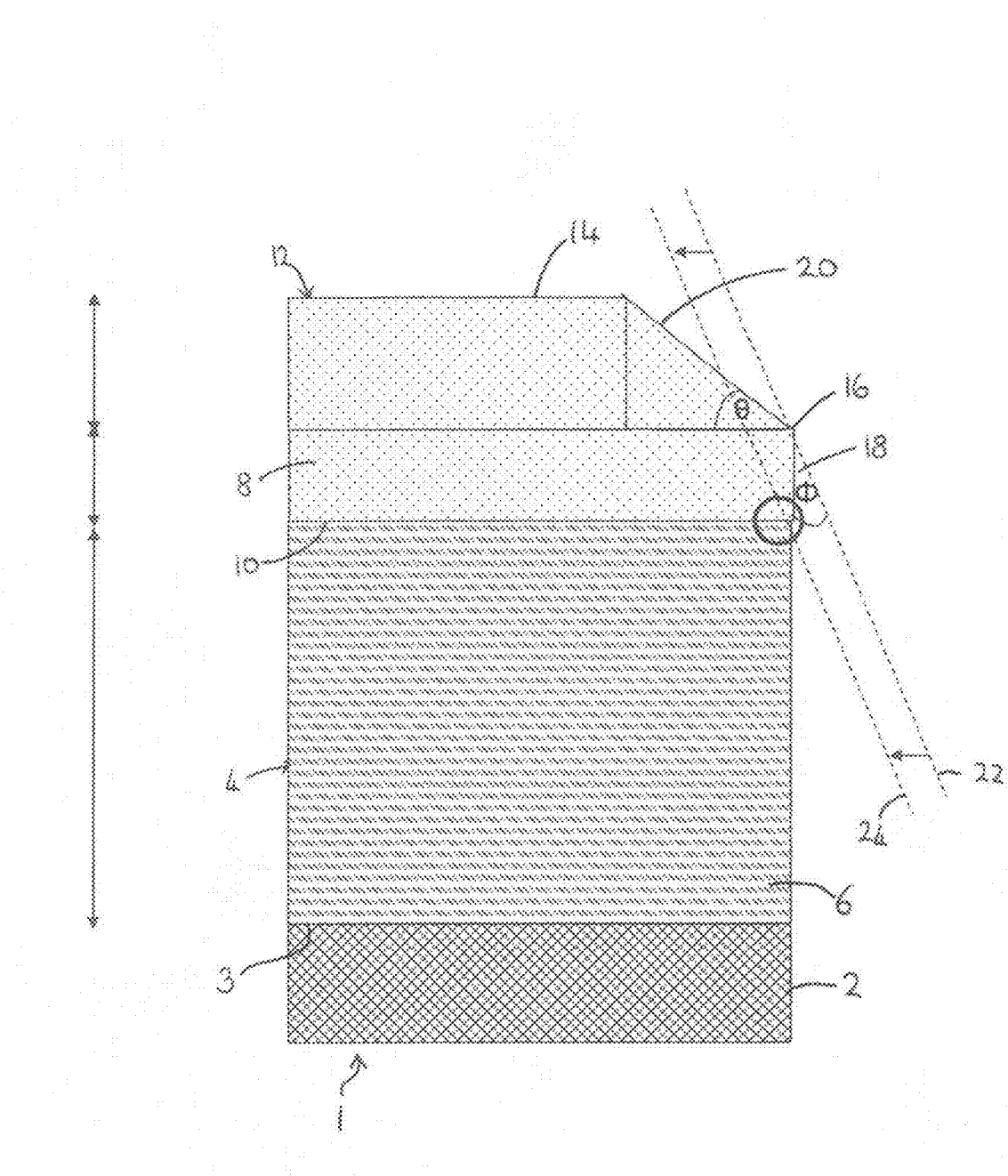
FIG. 1 is schematic partial cross-section through a first embodiment of a cutter.
Figure 2:
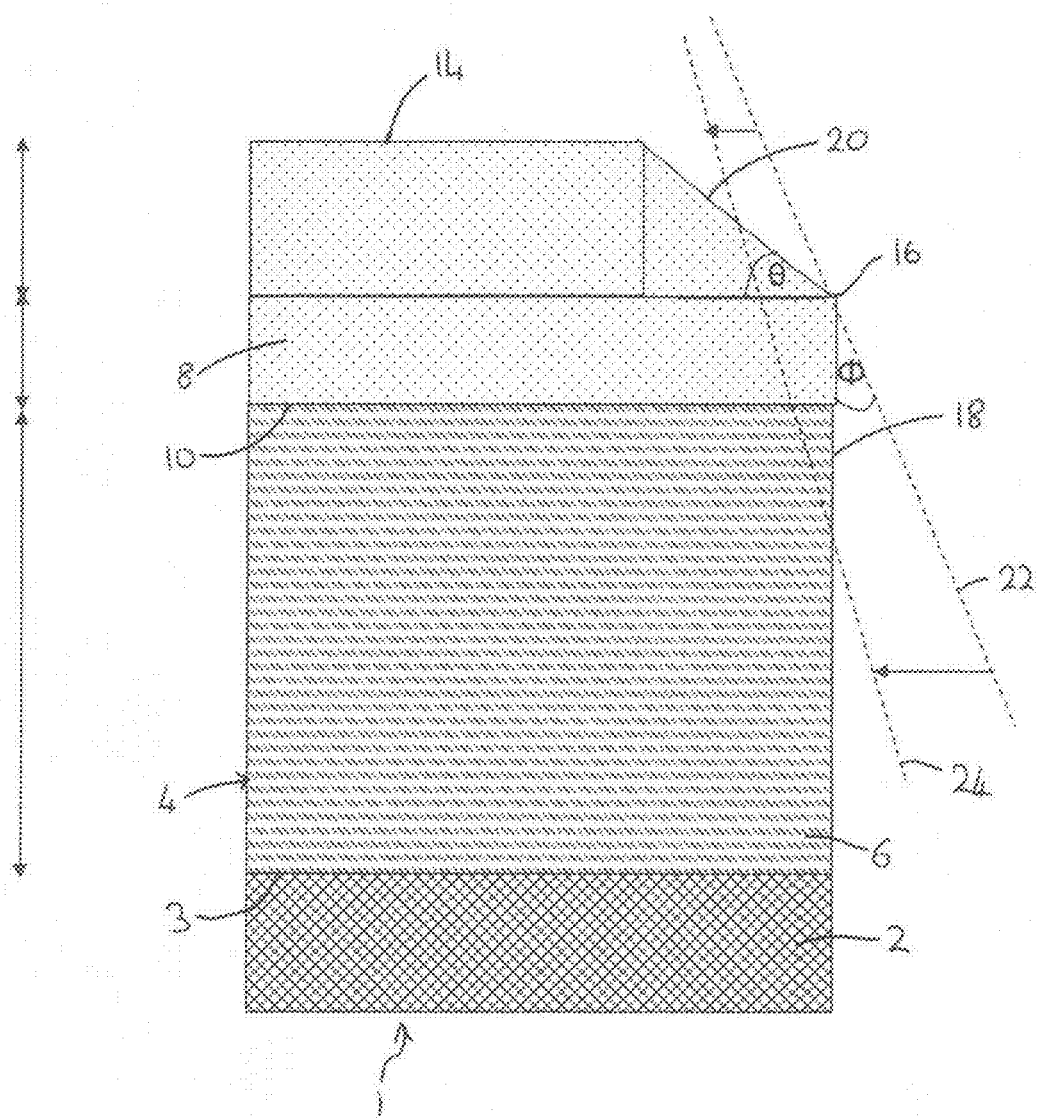
FIG. 2 is a schematic partial cross-section through the cutter of FIG. 1 showing progression of a wear scar.
Figure 3:
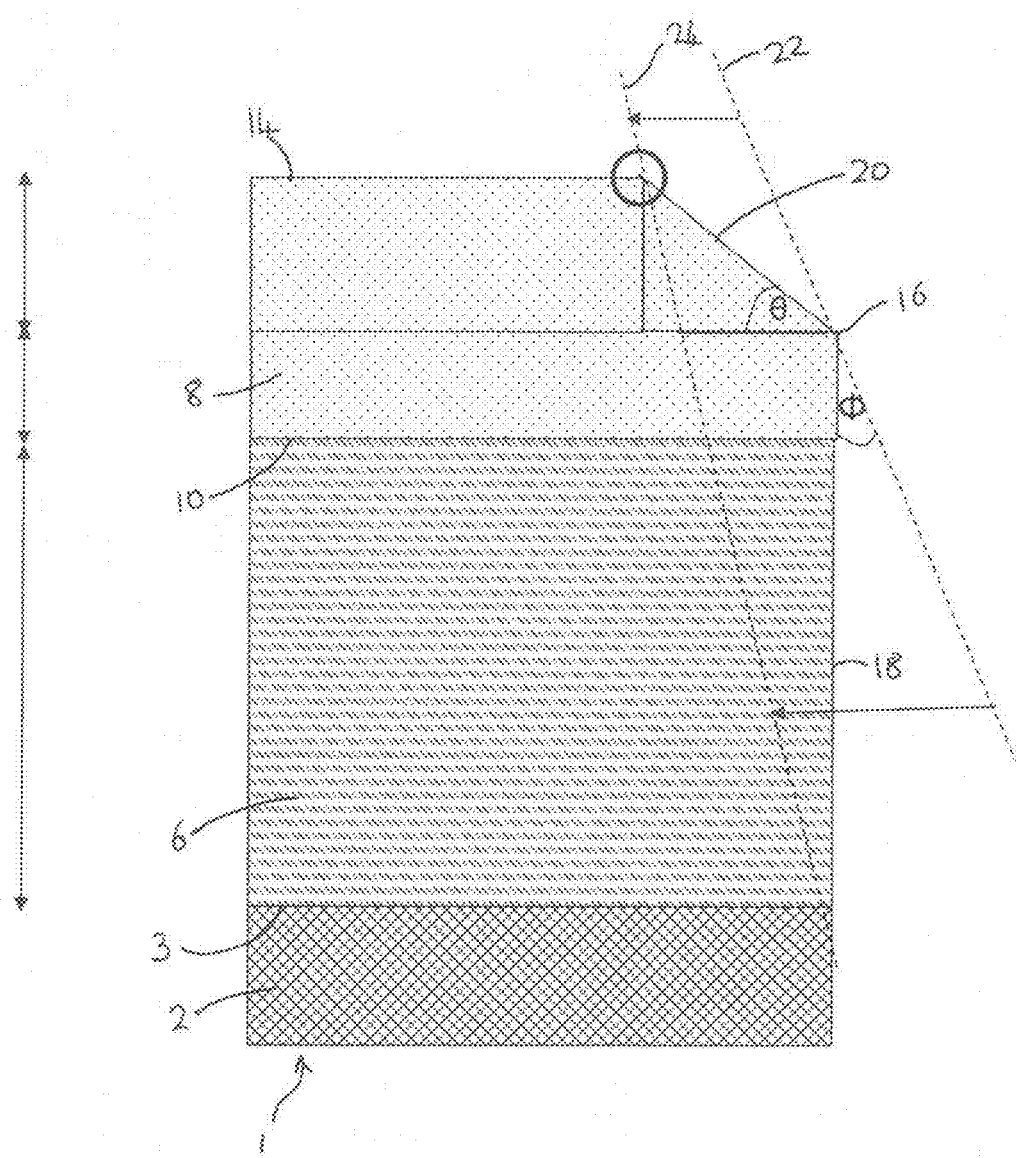
FIG. 3 is a schematic partial cross-section through the cutter of FIG. 1 showing further progression of a wear scar.

A cutter 1 according to a first embodiment is shown in FIGS. 1 to 3. The cutter 1 comprises a substrate 2 bonded along an interface 3 to a body of polycrystalline diamond (PCD) material 4. The body of PCD material comprises a first region 6 of PCD material bonded to the substrate 2 and a second region 8 of PCD material bonded to the first region 6 along a further interface 10. The exposed surface 12 of the second region 8 forms a rake face 14, a chamfer 20 extending between the rake face 14 and a cutting edge 16, and at least a part of a flank 18 of the cutter 1, the cutting edge 16 being defined by the edge of the chamfer 20 and the flank 16.

The "rake face" 14 of the cutter 1 is the surface or surfaces over which the chips of material being cut flow when the cutter 1 is used to cut material from a body, the rake face 14 directing the flow of newly formed chips, and is commonly referred to as the top face of the cutter. As used herein, "chips" are the pieces of a body removed from the work surface of the body by the cutter 1 in use.

As used herein, the "flank" 18 of the cutter 1 is the surface or surfaces of the cutter 1 that passes over the surface produced on the body of material being cut by the cutter 1 and is commonly referred to as the side or barrel of the cutter. The flank 18 may provide a clearance from the body and may comprise more than one flank face.

As used herein, a "cutting edge" 16 is intended to perform cutting of a body in use. A "rounded cutting edge" is a cutting edge that is formed by a rounded transition between the rake face and the flank.

As used herein, a "wear scar" is a surface of a cutter formed in use by the removal of a volume of cutter material due to wear of the cutter. A flank face may comprise a wear scar. As a cutter wears in use, material may be progressively removed from proximate the cutting edge, thereby continually redefining the position and shape of the cutting edge, rake face and flank as the wear scar forms. As used herein, it is understood that the term "cutting edge" refers to the actual cutting edge, defined functionally as above, at any particular stage or at more than one stage of the cutter wear progression up to failure of the cutter, including but not limited to the cutter in a substantially unworn or unused state.

With reference to FIGS. 1 to 3, the chamfer 20 is formed in the structure adjacent the cutting edge 16 and flank 18. The rake face 14 is therefore joined to the flank 18 by the chamfer 20 which extends from the cutting edge 16 to the rake face 14, and lies in a plane at a predetermined angle θ to the plane perpendicular to the plane in which the longitudinal axis of the cutter 1 extends. In some embodiments, this chamfer angle is up to around 45 degrees.

The interface 10 between the first and second regions of PCD material, 6 and 8, is spaced from the cutting edge 16 which is defined by the second region 8. Therefore, the thickness of the second region 8 is greater than the vertical height of the chamfer 20.

The thickness of the first region 6 of PCD material is substantially greater than the thickness of the second region 8. For example, in some embodiments, the thickness of the second region 8 is up to around 600 microns and the thickness of the first region 6 is around 1200-1800 microns.

In some embodiments, the thickness of the second region 8 exceeds the vertical chamfer height by around 100-400 microns and the vertical height of the chamfer 20 may be, for example, around 400 microns.

In FIGS. 1 to 3, the hashed lines 22, 24 represent the work face making an angle φ with the longitudinal axis of the cutter 1. This angle φ is also referred to as the back-rake angle.

As the cutter 1 wears, the wear on the cutter 1 is shown by a shift in the hashed line 22 to the position denoted by the second hashed line 24. FIG. 1 shows the first stage where all cutting is carried out by the second region 8 of the body of PCD material. The first hashed line 22 shows the start of the cut and the second hashed line 24 shows where the wear has reached the interface 10 between the first and second regions 6, 8 of PCD material. The initial back rake angle φ and its progress shift is thereby shown in FIG. 1 as the cutter 1 wears during use, the wear-flat eventually reaching the thicker/softer PCD layer of the first region 6.

FIG. 2 shows further wear of the cutter 1 after additional use and it will be seen that the wear flat proceeds more quickly in the softer layer of the first region 6 of PCD material than in the more wear resistant layer of the second region 8 of the body of PCD material. The wear has therefore progressed into the first region 6 and, as the material of the first region 6 wears faster than the material of the second region 8, the angle of the cutting face (denoted by the back rake angle φ) gradually decreases so that the wear of the first region 6 is greater than that of the second region 8.

This may have the effect of slowing down the progression of the wear-flat in the chamfer region 20.

FIG. 3 shows a further stage where the wear flat has reached the rake face 14 as it intersects the chamfer 20 and has also reached the interface 3 of the first region 6 and the substrate 2. Further wear and retardation of the wear flat in the chamfer region 20 delays the spalling which may occur when the wear flat reaches the corner of the chamfer 20 as denoted by the second hashed line 24.

Once the wear reaches the top of the chamfer 20, this could lead to spalling and, once the wear reaches the interface 3 between the substrate 2 and the first region 6, the cutter 1 may have reached the end of its useful working life.

Figure 4A:
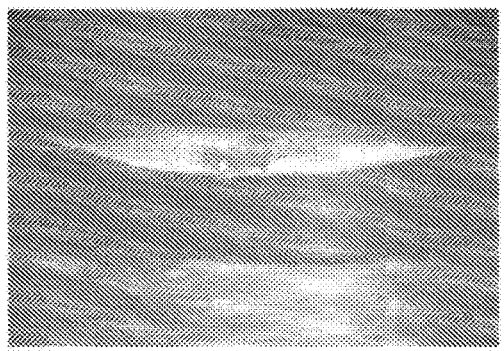
FIG. 4a is a side view of a conventional cutter showing the wear scar for a predetermined number of passes.

FIG. 4a is a side view of a conventional cutter showing the wear scar for a predetermined number of passes. It will be seen that the wear on this cutter is greater than that on the cutter of FIG. 4b which is in accordance with a first embodiment for the same predetermined number of passes as that applied to the cutter of FIG. 4a.

Figure 4B:
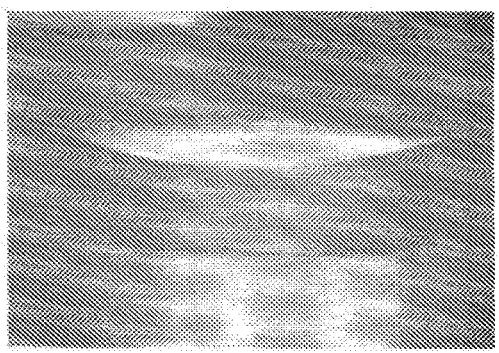
Figure 5A:
FIG. 5a is a side view of the conventional cutter of FIG. 4a after a further number of passes at which spalling has occurred.

FIG. 5a is a side view of the conventional cutter of FIG. 4a after a further number of passes at which spalling has occurred. It will be seen that there is extensive spalling damage to the cutter whilst the cutter of FIG. 4b after the same number of passes applied to the conventional cutter shows only a small amount of wear.

Figure 6:
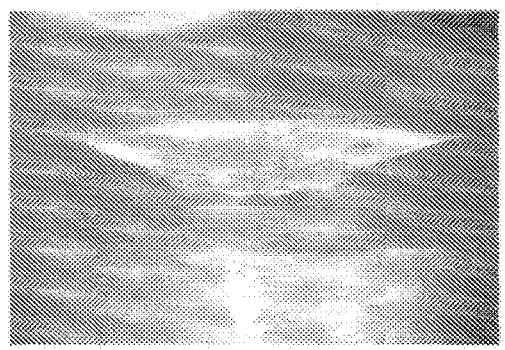
FIG. 6 is a side view of the embodiment of the cutter of FIG. 4b after a further number of passes.

FIG. 6 is a side view of the embodiment of the cutter of FIG. 4b after a further number of passes with the onset of spalling behaviour.

Figure 7A:
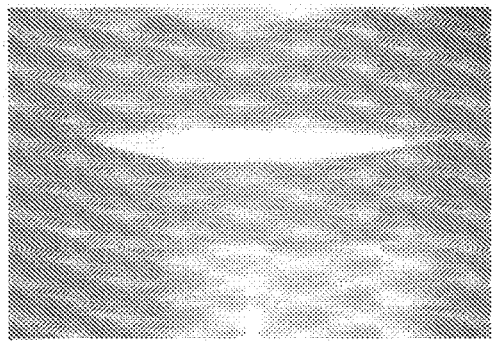
FIG. 7a is a side view of a further conventional cutter after a predetermined number of passes.
Figure 7B:
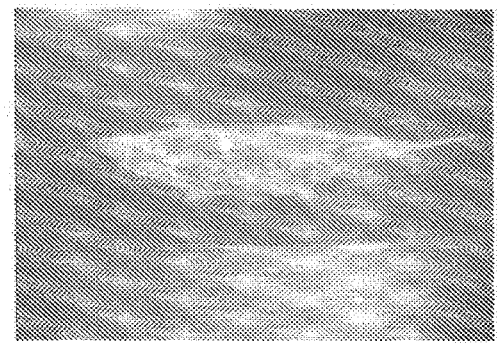

FIG. 7a is a side view of a further conventional cutter after a predetermined number of passes and FIG. 7b is a side view of a further embodiment of a cutter showing the wear scar for the same predetermined number of passes as that applied to the cutter of FIG. 7a. It will be seen that in the embodiment shown in FIG. 7b, whilst the wear scar is larger than that shown in FIG. 7a, the wear is all in the woody region.

Figure 8A:
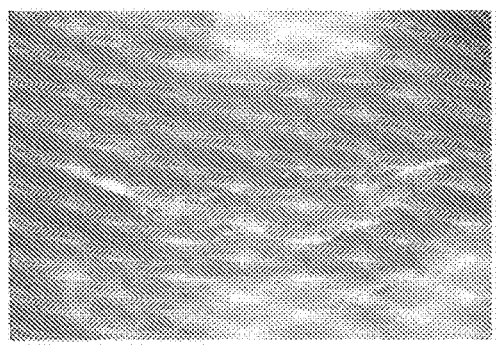
FIG. 8a is a side view of the conventional cutter of FIG. 7a after a further number of passes at which spalling has occurred.
Figure 8B:
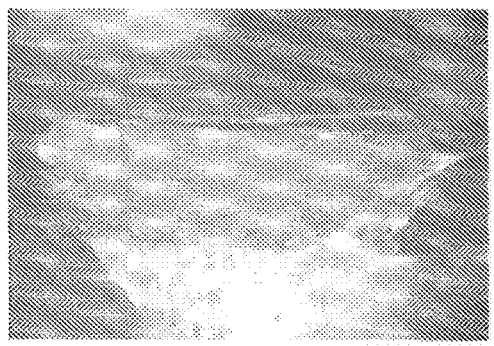

FIG. 8a is a side view of the conventional cutter of FIG. 7a after a further number of passes at which spalling has occurred. FIG. 8b is a side view of the embodiment of a cutter shown in FIG. 7b after the same number of passes applied to the conventional cutter of FIG. 8a. In the embodiment of FIG. 8b, the cutter has maintained a sharp cutting edge although the wear scar is larger than that in the cutter of FIG. 8a.

Figure 9:
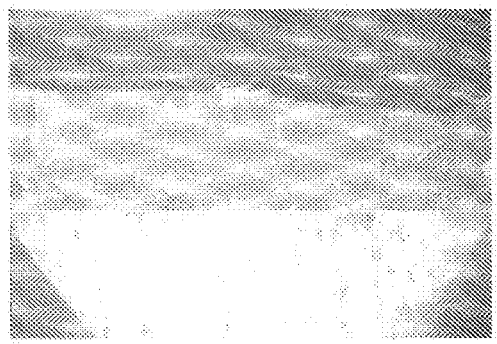
FIG. 9 is a side view of the embodiment of the cutter of FIG. 7b after a further number of passes.

FIG. 9 is a side view of the embodiment of the cutter of FIG. 8b after a further number of passes. The cutter has failed due to the large wear scar although a sharp cutting edge is still visible.

The material forming the second region 8 is chosen to be significantly more wear resistant than the material forming the first region 6. The significantly lower wear resistance of the first region 6 assists in enabling a desired wear pattern to be created in use.

The cutter 1 may be fabricated as follows.

As used herein, a "green body" is a body comprising grains to be sintered and a means of holding the grains together, such as a binder, for example an organic binder. Embodiments of superhard constructions may be made by a method including preparing a green body comprising grains of superhard material and a binder, such as an organic binder. The green body may also comprise catalyst material for promoting the sintering of the superhard grains. The green body may be made by combining the grains with the binder and forming them into a body having substantially the same general shape as that of the intended sintered body, and drying the binder. At least some of the binder material may be removed by, for example, burning it off. The green body may be formed by a method including a compaction process, injection or other molding, extrusion, deposition modelling or other methods. The green body may be formed from components comprising the grains and a binder, the components being in the form of sheets, blocks or discs, for example, and the green body may itself be formed from green bodies. For example, the green body for the superhard construction may be formed from distinct green bodies for each of the respective regions 6, 8, which may be formed separately into generally the intended shapes of the respective regions and combined to form a boundary defined by a contact interface.

One embodiment of a method for making a green body includes providing tape cast sheets, each sheet comprising a plurality of diamond grains bonded together by a binder, such as a water-based organic binder, and stacking the sheets on top of one another and on top of a support body. Different sheets comprising diamond grains having different size distributions, diamond content or additives may be selectively stacked to achieve a desired structure. The sheets may be made by a method known in the art, such as extrusion or tape casting methods, wherein slurry comprising diamond grains and a binder material is laid onto a surface and allowed to dry. Other methods for making diamond-bearing sheets may also be used, such as described in U.S. Pat. Nos. 5,766,394 and 6,446,740. Alternative methods for depositing diamond-bearing layers include spraying methods, such as thermal spraying.

A green body for the superhard construction may be placed onto a substrate, such as a cemented carbide substrate to form a pre-sinter assembly, which may be encapsulated in a capsule for an ultra-high pressure furnace, as is known in the art. The substrate may provide a source of catalyst material for promoting the sintering of the superhard grains. In some embodiments, the superhard grains may be diamond grains and the substrate may be cobalt-cemented tungsten carbide, the cobalt in the substrate being a source of catalyst for sintering the diamond grains. The pre-sinter assembly may comprise an additional source of catalyst material.

In one version, the method may include loading the capsule comprising a pre-sinter assembly into a press and subjecting the green body to an ultra-high pressure and a temperature at which the superhard material is thermodynamically stable to sinter the superhard grains. In one embodiment, the green body may comprise diamond grains and the pressure is at least about 5 GPa and the temperature is at least about 1,300 degrees centigrade. In one embodiment, the green body may comprise cBN grains and the pressure is at least about 3 GPa and the temperature is at least about 900 degrees centigrade.

An embodiment of a superhard construction may be made by a method including providing a PCD structure and a diamond composite structure, forming each structure into the respective complementary shapes, assembling the PCD structure and the diamond composite structure onto a cemented carbide substrate to form an unjoined assembly, and subjecting the unjoined assembly to a pressure of at least about 5.5 GPa and a temperature of at least about 1,250 degrees centigrade to form a PCD construction.

A version of the method may include making a diamond composite structure by means of a method disclosed, for example, in PCT application publication number WO2009/128034 for making a super-hard enhanced hard-metal material. A powder blend comprising diamond particles, particles of carbide material and a metal binder material, such as cobalt may be prepared by combining these particles and blending them together. Any effective powder preparation technology may be used to blend the powders, such as wet or dry multi-directional mixing, planetary ball milling and high shear mixing with a homogenizer. In one embodiment, the mean size of the diamond particles may be at least about 50 microns and they may be combined with other particles simply by stirring the powders together by hand. In one version of the method, precursor materials suitable for subsequent conversion into carbide material or binder material may be included in the powder blend, and in one version of the method, metal binder material may be introduced in a form suitable for infiltration into a green body. The powder blend may be deposited in a die or mold and compacted to form a green body, for example by uni-axial compaction or other compaction method, such as cold isostatic pressing (CIP). The green body may be subjected to a sintering process known in the art for sintering similar materials without the presence of diamond, such as may be used to sinter cemented tungsten carbide, to form a sintered article. For example, the green body may be sintered by means of hot pressing or spark plasma sintering. The diamond particles may wholly or partially convert to a non-diamond form of carbon, such as graphite, depending on the sintering conditions. The sintered article may be subjected to a subsequent treatment at a pressure and temperature at which diamond is thermally stable to convert some or all of the non-diamond carbon back into diamond and produce a diamond composite structure. An ultra-high pressure furnace well known in the art of diamond synthesis and the pressure may be at least about 5.5 GPa and the temperature may be at least about 1,250 degrees centigrade.

An embodiment of a superhard construction may be made by a method including providing a PCD structure and a precursor structure for a diamond composite structure, forming each structure into the respective complementary shapes, assembling the PCD structure and the diamond composite structure onto a cemented carbide substrate to form an unjoined assembly, and subjecting the unjoined assembly to a pressure of at least about 5.5 GPa and a temperature of at least about 1,250 degrees centigrade to form a PCD construction. The precursor structure may comprise carbide particles and diamond or non-diamond carbon material, such as graphite, and a binder material comprising a metal, such as cobalt. The precursor structure may be a green body formed by compacting a powder blend comprising particles of diamond or non-diamond carbon and particles of carbide material and compacting the powder blend.

The present disclosure may be further illustrated by the following examples which are not intended to be limiting.

EXAMPLE 1

In one embodiment, ultra-high pressure and temperature may be used to sinter the superhard construction at approximately 6.8 GPa or higher. The resulting top layer, namely the second region 8 may comprise sintered fine grains of multimodal diamond, with average final grain size of, for example, approximately 0.1 to 10 µm, 1 to 8 µm, 3 to 6 µm or 3.5 to 4.5 µm. This second region 8 may be, for example, between 400 µm and 1000 µm thick, or between 600 µm and 800 µm thick. The vertical height of the chamfer 20 may be, for example, between 350µm and 450 µm, such as around 400 µm. The first region 6 may comprise less wear resistant sintered coarser grains of multimodal diamond of average final size of, for example, approximately 6.0 to 20 µm, 8 to 17 µm, 6 to 17 µm or 8.0 to 9.0 µm. This first region 6 may be, for example between about 1200 µm and 1800 µm thick, such as between about 1400 µm and 1600 µm thick.

Figure 5B:
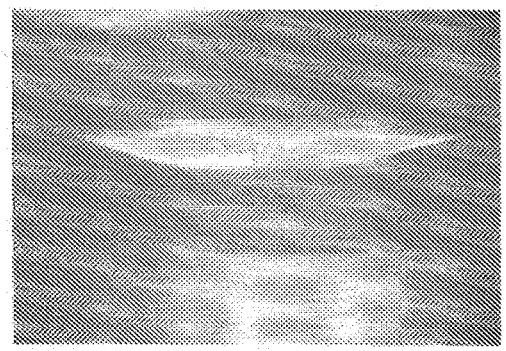

Such an embodiment of a PCD compact may, for example, be prepared as follows. 2.5 g of a first multimodal diamond powder mix having an average particle size of approximately 7 µm and 2.5g of a second multimodal diamond powder mix having an average particle size of approximately 11 µm and 3 weight percent VC—TiC admix may be prepared and bound into organic tape which is easily removable by pre-heating, using methods well known in the art. Sufficient discs of the first tape to form a top sintered layer of approximately 600 µm final thickness may be placed in a Niobium canister, and similarly sufficient discs of the second tape to form the underlying sintered layer of approximately 1600 µm final thickness may be placed in the canister on top of the first discs. A tungsten carbide substrate is then placed in the Niobium canister on top of the second discs, the canister is sealed and then heat-treated to remove the organic binders. The canister may be treated at ultra-high pressure and temperature (for example at approximately 1600° C. and 6.8 GPa or greater). After sintering, the PCD cutters may be ground to size including a 45° chamfer of approximately 0.4 mm height on the body of PCD material so produced. Cutters produced according to the above have been subjected to wear tests (as shown in FIGS. 4b, 5b and 6) by suitably preparing them as would be appreciated by the skilled person, to machine a granite block mounted on a vertical turret milling apparatus and counting the number of passes before failure. The average number of passes achieved was approximately 65% better than that of a commercial benchmark, namely that shown and described above with reference to FIGS. 4a and 5a.

EXAMPLE 2

In a further embodiment, the second region 8 may comprise coarse sintered grains of multimodal diamond, with average final size of approximately 4.5-5.5 µm. In this embodiment, the source diamond may be admixed with any combination of, for example TiC, TaC, VC, carbonitrides of Ti, Ta, V, in amounts 1% to 6% by weight. An example of such an admix is 2-4% TiC—VC. This second region 8 may be, for example between 400 μm and 1000 μm thick, such as between 600 μm and 800 μm thick. The chamfer angle is approximately 45° with vertical height of the chamfer 20 being, for example between around 350 μm and 450 μm, such as around 400 μm. The first region 6 may comprise less wear resistant sintered coarser grains of multimodal diamond of average final size of approximately 8.0-9.0 μm. This first region 6 may, for example, be between about 1200 μm and 1800 μm thick, such as between about 1400μm and 1600 μm thick.

Such an embodiment of a PCD compact may, for example, be prepared as follows. 2.5 g of two multimodal diamond powder mixes having average particle sizes of approximately 5 μm and approximately 11 μm may be prepared and bound into organic tape easily removed by pre-heating, using methods well known in the art. Sufficient discs of the first tape to form a top sintered layer of approximately 600 μm final thickness are placed in a Niobium canister, and similarly sufficient discs of the second tape to form the underlying sintered layer of approximately 1600 μm final thickness are placed in the canister on top of the first discs. A tungsten carbide substrate is then placed in the Niobium canister on top of the second discs, the canister is sealed and then heat-treated to remove the organic binders. The canister may be treated at ultra-high pressure and temperature (such as approximately 1600° C. and 6.8 GPa). After sintering, the PCD cutters may be ground to size including a 45° chamfer of 0.4 mm height on the body of the PCD material. Cutters produced in this manner were subjected to wear tests by suitably preparing them as would be appreciated by the skilled person, to machine a granite block mounted on a vertical turret milling apparatus and counting the number of passes before failure. The average number of passes achieved, as illustrated in FIGS. 7*b*, 8*b* and 9, outperformed a corresponding conventional cutter (as shown in FIGS. 7*a* and 8*a*) which had not been surface-treated by a factor of about three.

Whilst not wishing to be bound by a particular theory, the above results indicate that more wear-resistant finer-grain PCD material on less wear-resistant coarser-grain PCD material may significantly enhance the durability of the cutter produced according to some embodiments described herein. The wear starts in the thinner, more wear-resistant layer of the second region 8 and progresses to the underlying thicker, less wear-resistant layer of the first region 6 which is bonded to the substrate 2. Unlike in typical monolayer configurations known in the art, these configuration may assist in diverting the wear scar downwards into the barrel of the PCD body, instead of the typical behaviour, in which the wear-scar generates cracks which move to the free surfaces of the cutter and result in failure through spalling. This has the effect that the wear behaviour in cutters according to some embodiments may remain longer in the smooth to "woody" wear region, before eventually spalling. Performance may be further improved when the interface 3 between the body of PCD material and the substrate 2 is non-planar (not shown).

The invention claimed is:

1. A polycrystalline superhard construction comprising:
   a body of polycrystalline superhard material;
   a substrate of hard material bonded to the body of polycrystalline superhard material along an interface;
   wherein the body of polycrystalline superhard material comprises a first region and a second region, the first region abutting the substrate along the interface and the second region being bonded to the first region along a further interface,
   the second region defining a rake face, a cutting edge, a chamfer and at least a part of a flank face, the cutting edge being defined by an edge of the flank face joined to the chamfer, the chamfer extending between the cutting edge and the rake face;
   the first region having a first thickness and the second region having a second thickness;
   the chamfer having a height in a plane parallel to the plane through which the longitudinal axis of the polycrystalline superhard construction extends, the height of the chamfer being less than the thickness of the second region;
   the first region comprising a material having coarser grains than the material of the second region; wherein
   the thickness of the second region is up to around 600 microns; and
   the thickness of the second region exceeds the height of the chamfer by around between 100 to 400 microns.

2. A polycrystalline superhard construction according to claim 1 wherein the thickness of the first region is greater than the thickness of the second region.

3. A polycrystalline superhard construction according to claim 1, wherein the thickness of the first region is around 1200-1800 microns.

4. A polycrystalline superhard construction according to claim 1, wherein the height of the chamfer is between around 100-400 microns.

5. A polycrystalline superhard construction according to claim 1, wherein the body of polycrystalline superhard material comprises polycrystalline diamond material.

6. A polycrystalline superhard construction according to claim 5, wherein the average grain size of the diamond grains forming the second region in the body of polycrystalline diamond material is between around 0.1 to 10 microns.

7. A polycrystalline superhard construction according to claim 5, wherein the average grain size of the diamond grains forming the second region in the body of polycrystalline diamond material is between around 1 to 8 microns.

8. A polycrystalline superhard construction according to claim 5, wherein the average grain size of the diamond grains forming the second region in the body of polycrystalline diamond material is between around 3 to 6 microns.

9. A polycrystalline superhard construction according to claim 5, wherein the average grain size of the diamond grains forming the first region in the body of polycrystalline diamond material is between around 6 to 20 micron.

10. A polycrystalline superhard construction according to claim 5, wherein the average grain size of the diamond grains forming the first region in the body of polycrystalline diamond material is between around 8 to 17 microns.

11. A polycrystalline superhard construction according to claim 5, wherein the average grain size of the diamond grains forming the first region in the body of polycrystalline diamond material is between around 6 to 17 microns.

12. A polycrystalline superhard construction according to claim 1, wherein the chamfer angle is approximately 45°.

13. A polycrystalline superhard construction according to claim 1, wherein the interface between the first region and the substrate is substantially non-planar.

14. A polycrystalline superhard construction according to claim 1, wherein the substrate comprises cemented carbide.

15. A cutter for boring into the earth comprising the polycrystalline superhard construction according to claim 1.

16. A PCD element for a rotary shear bit for boring into the earth, for a percussion drill bit or for a pick for mining or asphalt degradation, comprising the polycrystalline superhard construction of claim 1.

17. A drill bit or a component of a drill bit for boring into the earth, comprising a polycrystalline superhard construction according to claim 1.

\* \* \* \* \*